July 19, 1966  S. R. YOUNG  3,261,203
APPARATUS FOR MEASURING FORCES IN
COMPRESSION OR IN TENSION
Filed Aug. 15, 1963  5 Sheets-Sheet 1
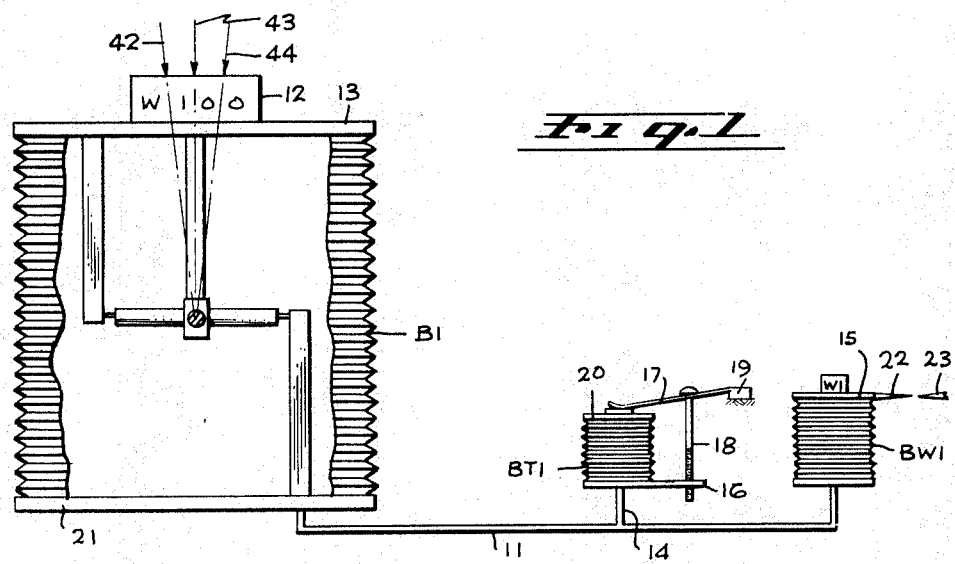
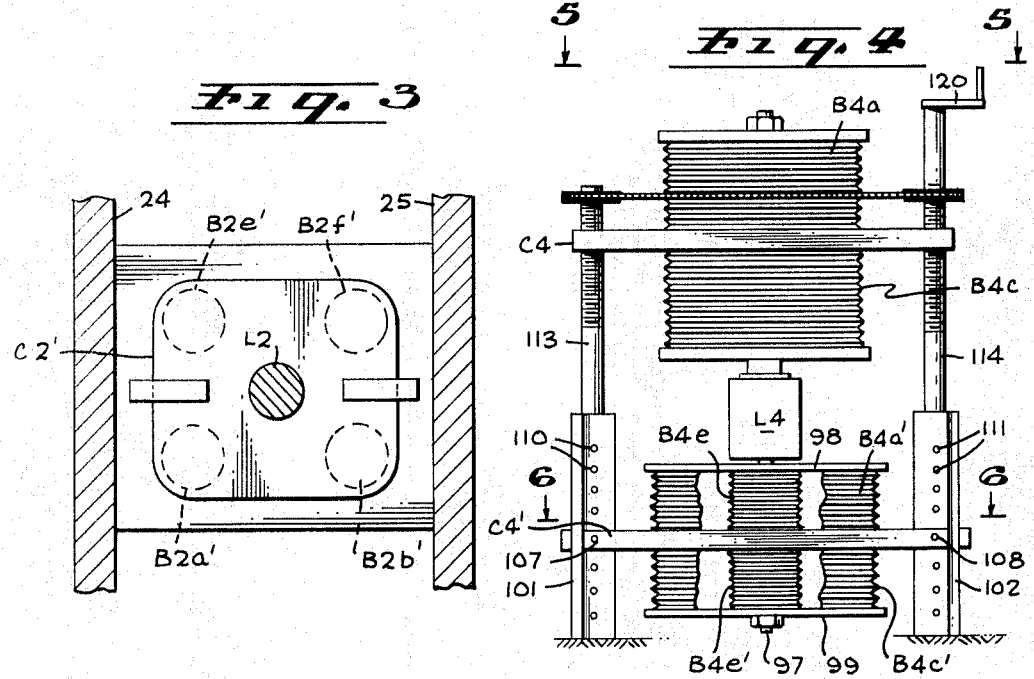
INVENTOR.
SHIRREL R. YOUNG
BY LeRoy J. Leishman
AGENT

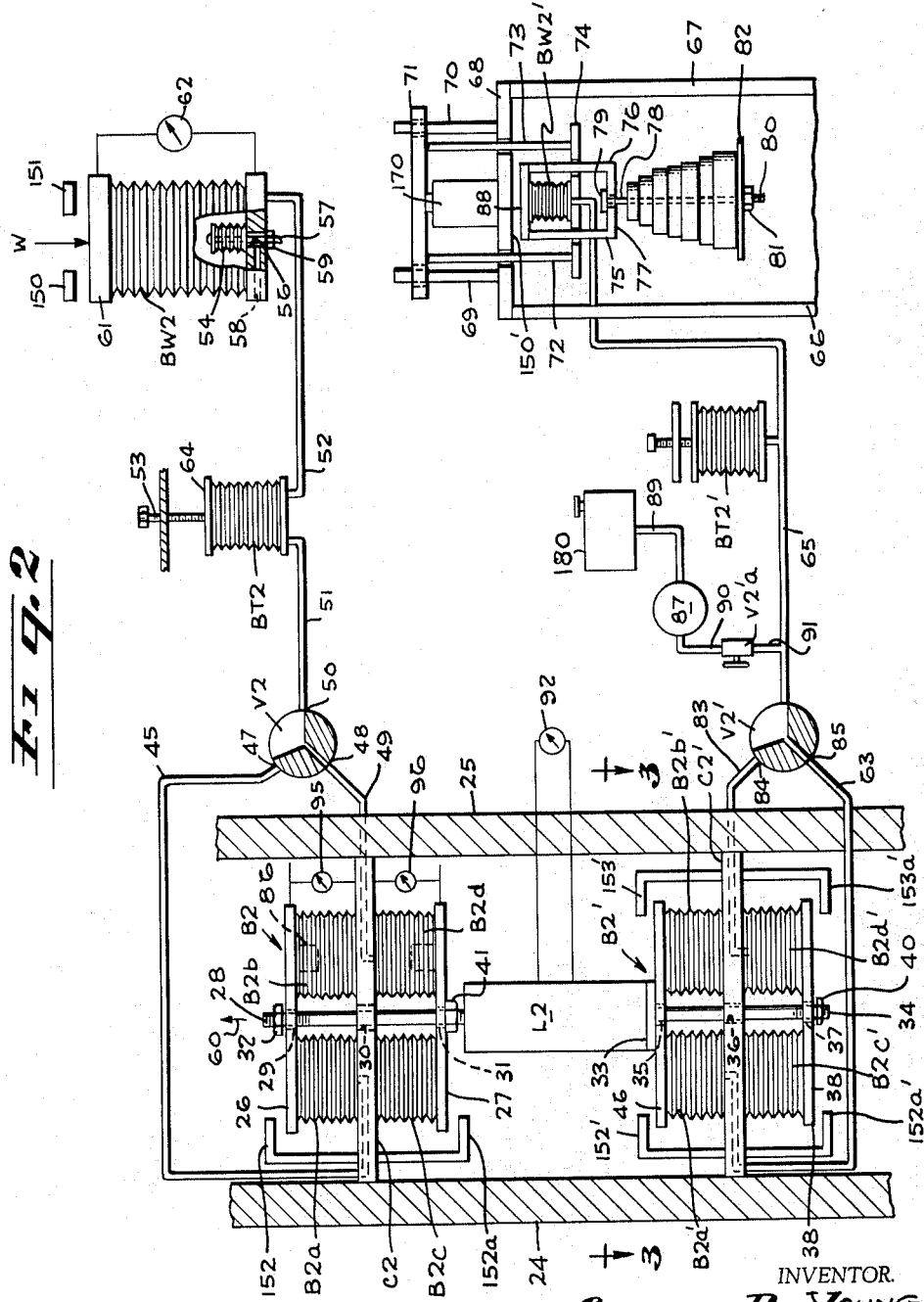

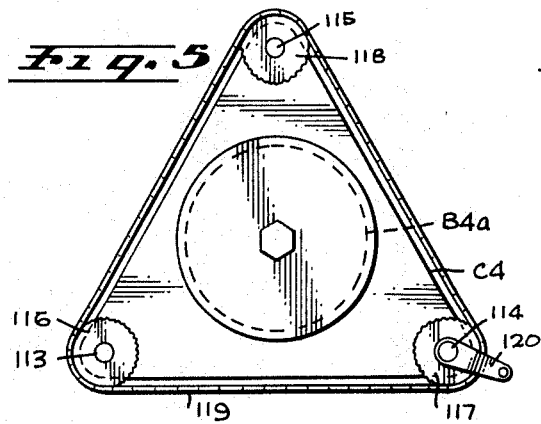
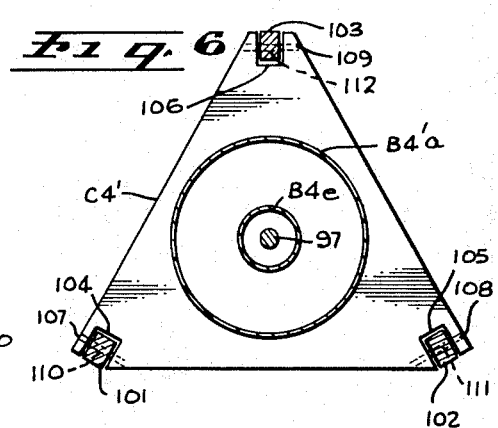
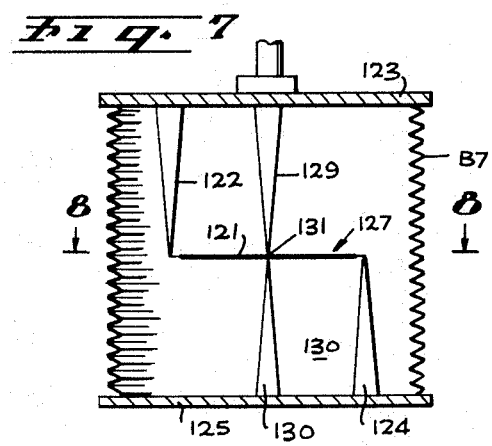
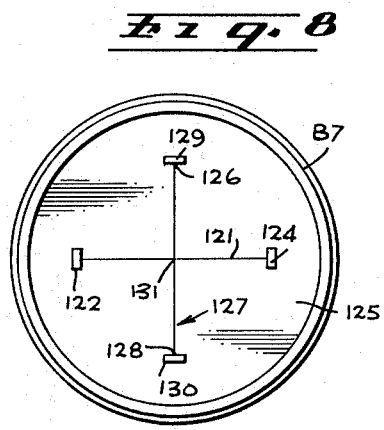
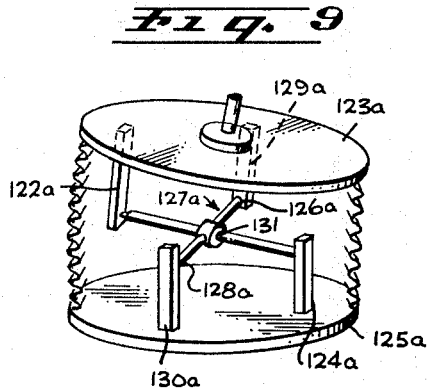
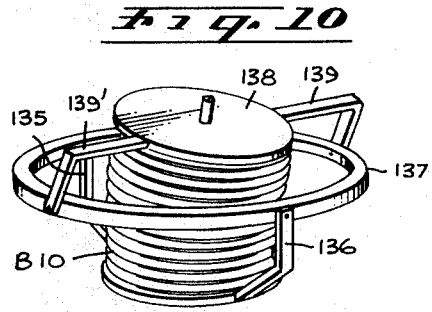

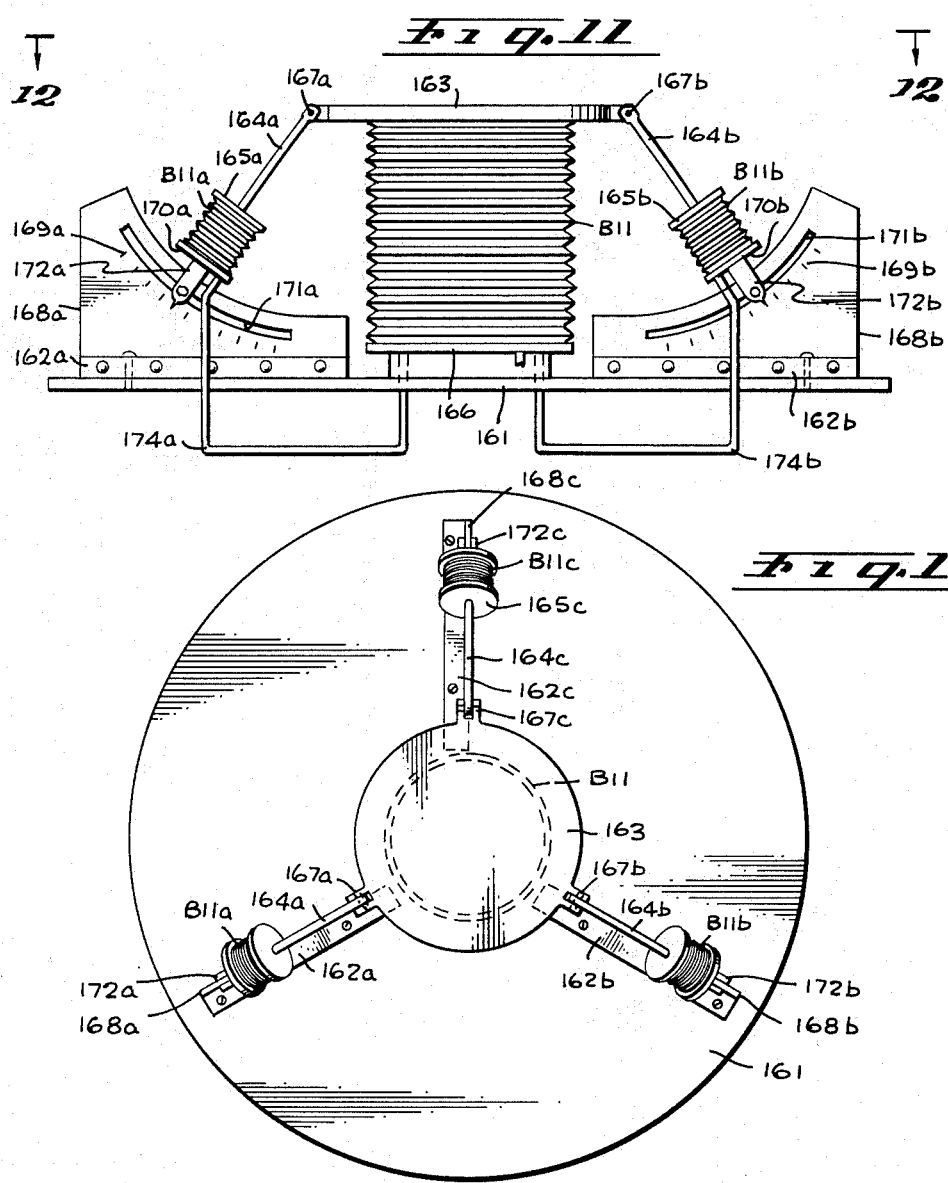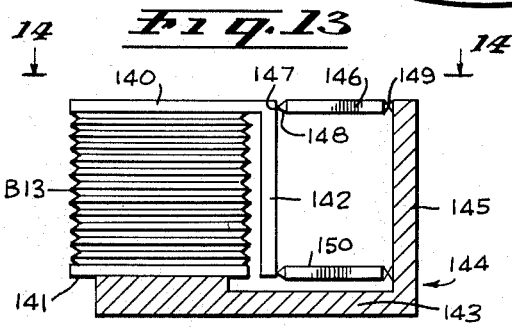

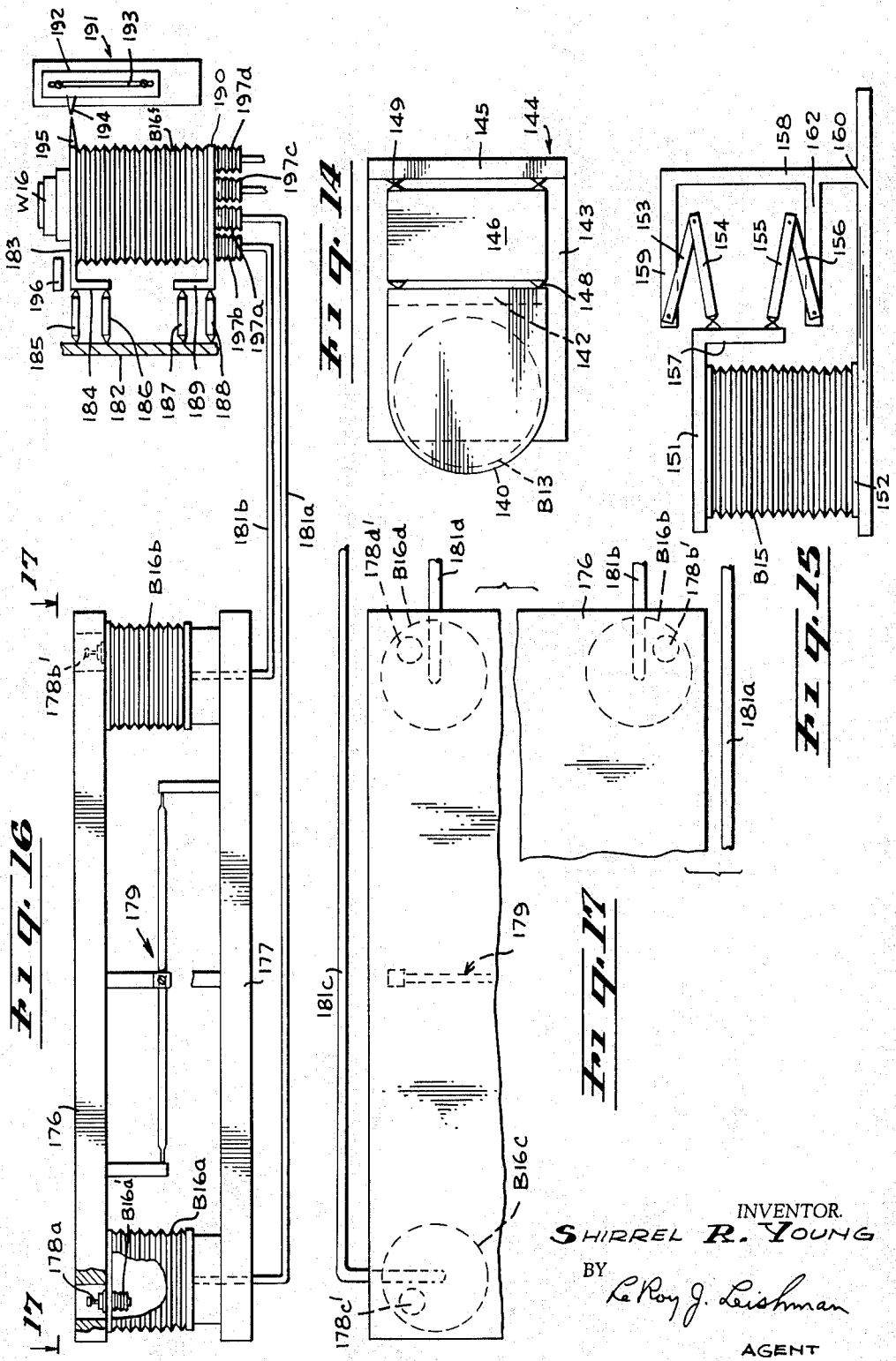

United States Patent Office 3,261,203
Patented July 19, 1966

3,261,203
APPARATUS FOR MEASURING FORCES IN COMPRESSION OR IN TENSION
Shirrel R. Young, Westminster, Calif., assignor to Astro-Space Corporation, Santa Ana, Calif., a corporation of California
Filed Aug. 15, 1963, Ser. No. 302,372
5 Claims. (Cl. 73—141)

The invention herein described pertains to hydraulically operated force multipliers that may also be used for measuring forces in compression or tension, and more particularly to apparatus of this type in which the greater portion of the hydraulic fluid is contained in metal bellows. The invention also comprises means for controlling the flexing of the bellows.

Weighing apparatus has long been employed utilizing Archimedes' principle, as the force multiplication that may be obtained by this means is vastly greater than for equipment of convenient size than is possible with scales utilizing long and short lever arms in which calibrated counterbalancing weights are applied to the long arm. A platform may be supported on a large number of hydraulically intercommunicating bellows, each of which may have a diameter many times greater than that of the bellows to which the balancing or measuring weights are applied. Stock metal bellows are now available in diameters as large as seven feet, or eighty-four inches, which thus have an area of 84 x 84 x .7854 or 7.056 x .7854 square inches. Such a bellows may communicate hydraulically with a calibrated balancing bellows having an area of only one inch. With this ratio, a weight of only one pound will balance a weight of 5,542 pounds on the large bellows. An equivalent performance with a beam scale in which 5,542 pounds is applied one foot from the fulcrum would of course require that the other arm be 5,542 feet long, if the weight to be measured is to be counterbalanced by a one pound weight. When bellows instead of hydraulic cylinders are used for such a hydraulic scales, friction is of course reduced to a minimum, and a precision result is obtained not only because of the relative freedom from friction but also because the superior seals that are possible with properly constructed bellows result in an absence of leakage losses.

Bellows have the additional advantage of acting somewhat like universal joints in that rods and shafts connected to them do not have to be aligned with the bellows' longitudinal axes, and forces may consequently be directed against the bellows over a relatively wide angle.

A principal object of the present invention is to supply apparatus and methods for measuring forces in compression or tension with greater precision than has heretofore been possible.

Another object is to provide apparatus of such versatility that the same apparatus may respond either to compression or tension merely by turning a control valve.

A further object is to provide apparatus of the type described in which a strain gauge or load cell may be tested or accurately calibrated in a practical manner by using a bellows to apply a measured force either in compression or tension to such gauge or cell.

An additional object is to provide a bellows structure in apparatus of the type heretofore mentioned in which a reference platform or surface may be very accurately positioned or stabilized, it being hazardous to relay upon a surface that is fixed with respect to the ground because of varying stresses in any supporting structure as well as in the ground itself.

An additional object is to provide easily operable volume or position controls for setting the top plate of a bellows at a precise position with respect to the bottom plate of such bellows.

Yet another object is to provide equalizing or compensating means for keeping the top plates of a plurality of bellows in the same plane or at the same pressure.

Another object is to supply compensating means for the small bellows to which the measuring weights are to be applied in order to set the top plate of such bellows at a precise zero position where it is free from spring tension while the apparatus is being used for measuring a force.

Yet another object is to provide a structure so associated with the small diameter bellows that the compensating weights may hang, as is the customary arrangement for beam scales, thus avoiding the necessity of having to stack such weights on the top of the small diameter master bellows.

A further object is the provision of means for controlling the flexing of the bellows.

A subsidiary object in connection with the control of the flexing of the bellows is the provision of means of such variety that the flexure control device may be installed either inside the bellows or on the outside.

Another subsidiary object is the provision of a flexure of the type described that will assure that the bellows will flex or rock with a universal joint motion around a central point midway between the top and bottom plates of a given bellows while it is supporting a heavy load, such pivoting point being provided at the intersection of actual or physical axes within the bellows or at the insection of phantom axes within the bellows when the control structure is located outside the bellows.

A further object is the provision of means for positioning one or more bellows at any desired distance, within limits, above another similar set of bellows, and to make it possible to vary such separation by easily controllable means and in very minute increments.

Yet another object is the provision of lever or linkage systems to assure that the top plate of a bellows will move rectilinearly rather than angularly with respect to the bottom plate.

Still another object is the provision of small trimmer bellows of variable effective area connected by flexible conduits to a large bellows for accurately predetermining the effective area of the combined associated bellows.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

FIGURE 1 is a diagrammatic illustration of a hydraulic weighing system utilizing a large bellows (shown partly cut away) to receive the weight or force to be measured and employing a small bellows to receive the compensating weight, a small trimmer bellows being in communication with the other two bellows and the large bellows containing a structure that assures that the bellows will flex around a central point midway between its top and bottom plates;

FIG. 2 is a diagrammatic illustration of complete apparatus for measuring forces either in compression or tension, or for applying forces either in compression or tension to load cells or strain gauges for testing or calibrating them;

FIG. 3 is a section taken on line 3—3 of FIG. 2;

FIG. 4 is an illustration of a bellows structure for receiving forces either in tension or compression, together with means for varying the distance between two sets of bellows, either one of which may be used as a reaction or reference system for the other set;

FIG. 5 is a section taken substantially on line 5—5 of FIG. 4;

FIG. 6 is a section taken substantially on line 6—6 of FIG. 4;

FIG. 7 is a diagram to illustrate the theory of a device disposable within a bellows to assure that any lateral flexing of the bellows will be around a point that is centrally located between the bellows' end plates;

FIG. 8 is a section taken on line 8—8 of FIG. 7;

FIG. 9 is an isometric view, partly cut away, showing a physical embodiment of the system diagrammatically shown in FIG. 7;

FIG. 10 is a diagrammatic illustration of another mechanism for accomplishing the same purpose that is achieved by the mechanism illustrated in FIGURES 7, 8 and 9, excepting that the components which assure the central locus of the flexing are located on the outside of the bellows;

FIG. 11 is a diagrammatic illustration of a system whereby a plurality of trimmer bellows may be used for varying the combined effective area of a central bellows and the trimmer bellows;

FIG. 12 is a view taken on line 12—12 of FIG. 11;

FIG. 13 is a diagrammatic representation of a system for assuring that the top plate of a bellows moves translationally with respect to the lower plate;

FIG. 14 is a view taken on line 14—14 of FIG. 13;

FIG. 15 is a diagrammatic illustration of a modification of the system shown in FIGS. 13 and 14, this modification being one that effects a substantially translational or longitudinal movement of all points on the top plate of a bellows;

FIG. 16 is a diagrammatic representation of a hydraulic scales or weighing apparatus including a platform, shown in side elevation, for receiving the object to be weighed; and FIG. 17 is a view taken substantially on line 17—17 of FIG. 16.

The invention illustrated in the various figures may perhaps be most readily understood by first considering the apparatus for measuring forces in compression illustrated in FIG. 1. As shown in this figure, a bellows of relatively large diameter B1 communicates by means of a conduit 11 with a bellows of relatively small diameter BW1. A third bellows BT1 of relatively small diameter is connected by tube 14 to the conduit 11 which hydraulically connects bellows B1 and bellows BW1. Bellows BT1, with associated parts, serves as a volume or top plate position control with micrometric adjusting means for varying the position or height of the top plate 13 of bellows B1, as well as the top plate 15 of bellows BW1. All three of these bellows and the interconnecting tube and conduit are filled with a hydraulic fluid, preferably silicon oil substantially free from air and other impurities; and since all three of the bellows and their interconnections are sealed, the entire apparatus constitutes a closed or a sealed hydraulic system.

A lever 17 having a fixed pivot 19 bears upon the top plate 20 of the position control bellows BT1, and a screw 18 passes through an appropriate clearance opening in lever 17 and is threaded into the extension 16 of the base of bellows BT1. By rotating the screw 18, bellows BT1 may be compressed in order to expel hydraulic fluid therefrom, or it may be permitted to expand in order to allow hydraulic fluid to flow into it from the tube 14 and other parts of the closed hydraulic system that are external to the bellows BT1. This causes plates 13 and 15 to rise or fall, and it is thus possible to vary the position of plate 13 with respect to the bottom plate 21 of bellows B1 with great precision.

Before any compressive force is applied to plate 13, this top plate is accurately positioned at a predetermined level. The bellows BT1 and the previously described components associated therewith may thus be referred to as a null control. After the top plate 13 of bellows B1 has thus been accurately positioned, the pointer 22 attached to the top plate 15 of bellows BW1 and the cooperating pointer 23 must be accurately aligned.

After the apparatus shown in FIG. 1 has been thus adjusted for measuring a force in compression, such a force 12 represented by the weight W-100 is applied to the top surface 13 of bellows B1. This of course forces fluid through the connecting conduit 11 into bellows BW1 (the top plate 20 of bellows BT1 being effectively clamped in adjusted position by means of lever 17 and screw 18). This introduction of additional fluid into bellows BW1 causes the top plate 15 to rise. Sufficient small weights, represented by the weight W1, are then applied to the top surface 15 of bellows BW1 to restore the pointer 22 to alignment with pointer 23. The resulting downward movement of the top plate 15 of course forces fluid out of bellows BW1 through conduit 11 into bellows B1, whose top surface is thus restored to the position that it occupied before the force 12 was applied thereto. If the area of bellows B1 is one hundred times as great as that of bellows BW1, the force being measured will consequently be one hundred times the force exerted by weight W1 on bellows BW1. If the area of bellows B1 is one thousand times as great as that of bellows BW1, then one pound on bellows BW1 will represent one thousand pounds on bellows B1. It is possible by apparatus of this type to measure forces up to ten million pounds, and even beyond.

The system and apparatus shown partly in diagrammatic form in FIG. 2 accomplishes these purposes in a more sophisticated and accurate manner than would be possible with the simpler apparatus shown in FIG. 1. Furthermore, the apparatus shown in FIG. 2 makes it possible to measure forces either in tension or compression, the apparatus being adjustable for one or the other merely by turning a control valve.

The apparatus illustrated schematically in FIG. 2 comprises two complete and separate closed hydraulic systems, either one of which may be used for opposing the forces to be measured by the bellows in the other system, or for supporting a specimen that is to be tested or measured by its response to the application of such forces thereto.

The upper portion of FIG. 2 shows a multiple bellows assembly B2 to which the forces to be measured may be applied, using the lower set of bellows B2' for establishing the reference base or for supplying an opposing force; or the forces to be measured may be applied to the bellows structure B2', using the upper bellows assembly B2 to establish a reference base or reacting force.

The individual bellows making up the assembly B2' are supported by a central plate C2' anchored in parallel side walls 24 and 25 of the supporting framework or structure, and the bellows assembly B2 is similarly supported on a central plate C2 also anchored in the side walls 24 and 25 so that the top assembly may be disposed directly above the lower bellows assembly.

Since the amount of movement of plates in one set of bellows is to be determined with respect to components in the other set of bellows, it is of the utmost importance to be able accurately to determine the position of the plates in the bellows assembly that is to receive or oppose the force to be measured. Shrinkage or expansion or other forces can of course vary the separation of the center plates C2 and C2', and thus neither plate can be used as a fixed reference base or opposing abutment. For this reason, the surface or plate with respect to which the deviations are to be measured must be adjustable so that they may be accurately positioned before such measuring procedure begins. The manner in which this is done will be more readily apparent after the general construction of the bellows assemblies has been explained.

In the apparatus illustrated in FIG. 2, a plurality of bellows are supported on the center plate C2, the bottom edges of these bellows being appropriately welded to the supporting plate C2. Any number of bellows may of course be ganged together to operate in parallel as a single unit. Two such bellows B2a and B2b are shown attached to plate C2 with a top plate 26 suitably sealed to the top ends of the bellows.

Two other bellows B2c and B2d are welded to the under surface of the center supporting member C2, and a bottom plate 27 is sealed to the bottom ends of bellows B2c and B2d.

A bolt 28 passes through clearance apertures 29, 30 and 31 in plates 26, C2 and 27 respectively, and a nut 32 or other appropriate fastening means is attached, as by threads, to the upper portion of the bolt so that the nut may assume a fixed relationship with respect to plate 26 if the bellows attached to this plate are to be expanded from within or compressed by a downward force on the bolt. The lower end of bolt 28 may be appropriately secured to a load cell or strain gauge, such as load cell L2, for testing or calibration purposes; and this bolt, which may communicate with sensitive components within the cell, is suitably threaded to receive the downward thrust of the bellows that are sealed to plate 27.

The load cell or strain gauge L2 rests upon the upper plate 46 of the lower group of bellows B2' preferably with a washer 33 interposed therebetween; and another screw 34 is affixed to the lower end of the load cell, this bolt then passing through appropriate clearance apertures 35, 36 and 37 in plates 46, C2' and 38 respectively. The lower end 39 of this bolt is threaded to receive a nut 40 that may be positioned against plate 38 to cause bellows B2c' and B2d' to collapse when bellows B2a' and B2b' are expanded to press upward on the load cell.

As indicated in FIG. 3, the bellows assembly illustrated in this figure and in FIG. 2 contemplates the use of four bellows above and four bellows below each of the center plates C2 and C2', FIG. 3 showing in phantom the bellows B2e' and B2f' that would be obscured behind the bellows B2a' and B2b' in the FIG. 2 view.

The four bellows above plate C2, of which only bellows B2a and B2b may be seen in FIG. 2, communicate with each other by appropriate conduits which have been omitted for the sake of clarity. Conduit 45 shown entering bellows B2a thus carries fluid to and from all four of the bellows above the center supporting plate C2.

Conduit 45 is connected to a three port control valve V2 by means of its port 47, and a second port 48 is connected to conduit 49 which communicates with all four of the bellows that are connected to the under surface of plate C2. Port 50 of the three way valve V2 is connected by means of tube 51 to the null control or volume and micro position control unit BT2, and this control unit is in turn connected by tube 52 to the interior of the small bellows BW2, which is the counterpart of bellows BW1 of FIG. 1. All of the bellows in the hydraulic system shown in FIG. 2 are of course filled with hydraulic fluid, and bellows BT2 may be used as a micro or vernier position control unit for forcing fluid into or out of bellows BW2 and the various bellows located above the load cell L2. This is effected by means of the micrometer adjusting screw 53 that bears upon the top plate 64 of the bellows BT2.

Bellows BW2 is equipped with a micro null sensor 62 that indicates when the top and bottom of this bellows are at a neutral zero position, and the top and bottom plates of this bellows may be brought to such neutral position by means of a small compensating bellows 54 located on the inside of bellows BW2. The bottom of bellows 54 is of course sealed to the bottom plate 55 of bellows BW2, and its interior communicates with the outside air by means of an aperture 56 in plate 55 and the small channel 58 that opens into aperture 56. A screw 57 is rigidly secured to the under side of the sealed cover of the small bellows 54, and an expansion spring (omitted from this picture for the sake of clarity) surrounds the portion of the screw 57 that extends above plate 55, and it expands between this plate and the under side of the cover to urge the top of the bellows away from plate 55. An adjusting nut 59 is threaded over the protruding end of screw 57, and it is possible to expand or contract the vernier bellows 54 by rotating this nut. If screw 57 has right hand threads, the clockwise rotation of nut 59 will pull the top of bellows 54 down against the counteracting force of the compression spring that surrounds the upper portion of the screw, and the counterclockwise rotation of the nut will permit the spring to expand the vernier bellows. Inasmuch as nut 59 of course presses snugly against the under side of plate 55, it is impossible for the clearance aperture 56 that surrounds the adjusting screw 57 to communicate directly with the outside air. Hence the channel 58 that permits such communication.

When the control valve V2 is in the angular position shown in FIG. 2, the set of intercommunicating bellows that are secured to the under side of the supporting member C2 are in communication through tube 49 and the valve V2 with the conduit 51 which in turn communicates with the bellows BT2 and through it and conduit 52 with the bellows BW2.

If an object that is pulling away from the bellows assembly B2 in the direction of arrow 60 is appropriately attached to the bolt 28, it will of course cause the nut 41 to be pulled upwardly against the plate 27, thus causing the bellows that are attached thereto to be compressed, and hydraulic fluid will flow outward through line 49 into bellows BW2, causing it to expand; and the degree of the expansion will be indicated on the dial of the micro null sensor 62 that is associated with this bellows. Small weights may then be placed on the top surface 61 until the dial of the micro null sensor indicates that the plate 61 has been again restored to its original position. The sum total of these weights multiplied by the ratio of the combined area of the bellows depending from member C2 to the area of bellows BW2, will of course indicate the upward pressure that is being exerted upon the bolt 28.

If the bolt 28 is being subjected to a compressive force, such force may be measured by turning the control valve V2 to a position that will cause port 47 to open and port 48 to close, thus bringing line 45 into communication with line 51 and causing bellows BW2 to receive the liquid that the compressive force is causing to be expelled from the bellows attached to the top surface of plate C2. This force may now be measured in the same way that the bellows BW2 and its associated micro null sensor measured the previously described force pulling upwardly on bolt 28.

The role of the load cell L2 has not thus far been described in connection with these forces in tension or compression for the reason that we have not yet described the means for accurately positioning the plate 46 upon which the load cell is resting. This, of course, must first be accurately positioned before the load cell L2 can properly respond to forces pressing down on bolt 28.

The four intercommunicating bellows B2a', B2b', B2e' and B2f', FIG. 3, are in communication with the null control bellows BT2', FIG. 2, and the master pressure cell or bellows BW2' by means of conduit 63, valve V2' and conduit 65 when the control valve V2' is in the angular position shown in the figure. If the upper set of bellows B2 is being used to exert a downward reaction force, this force will cause the load cell to press down on the four bellows supported on the top surface of plate C2', thus forcing some of the hydraulic fluid in conduit 65 into bellows BW2' where the force exerted downwardly into the load cell may be measured when the control valve V2' is in the angular position shown. This will cause the cell or bellows BW2' to expand. If the force is great enough, the top surface 88 of the yoke that rests on the bellows will engage the under side 150' of cross member 68, thus arresting the expansion of bellows BW2'. The top plate of bellows BW2' may then be brought back to its original position and the force measured by the structure now about to be described.

The measuring bellows BW2, in the upper part of FIG. 2, is controlled, as indicated in our discussion of the measurements just described, by the direct application of weights to the top surface 61 of this bellows. In the closed hydraulic system of which the bellows below the load cell L2 are a part, the measuring bellows or master pressure cell BW2' is operated by weights that hang from the structure. The entire master pressure cell assembly comprises the uprights 66 and 67 and a cross member or platform 68 supported thereon, together with other connected members. These other members comprise guide elements 69 and 70 for the cross member 71 that may be raised and lowered by the hydraulic piston assembly 170 which rests on platform 68. Two rods 72 and 73 appropriately secured to cross member 71 depend from this cross member and support a suspended subplatform 74 to which bellows BW2' is attached. The subplatform has appropriate openings therein to pass the side members 75 and 76 of the rectangular yoke or frame that rests upon the top of bellows BW2.

The rectangular yoke has a bottom bar 77 having a clearance hole therein through which a rod 78 having a head 79 extends. The lower end 80 of this rod may be threaded to receive a nut 81 upon which a weight receiving tray or platform 82 may rest.

The force that is pressing down on cell L2 and causing fluid to be expelled from bellows B2$a$', B2$b$', B2$e$' and B2$f$' may of course be measured by stacking weights on the tray 82 until the top of bellows BW2' has been restored to its normal level.

If the weights that are stacked on the plate or tray 82 are calibrated and marked in terms of the forces that they balance by virtue of the ratio between the areas of the large bellows that are being compressed and the area of the bellows BW2', then the force that is being measured may of course be determined by the sum of the values marked on the weights that are stacked on tray 82. This method of stacking weights on a suspended plate is of course well known as it has long been used on beam scales throughout the world.

The hydraulic system just described has great flexibility in many respects, one of which is the freedom with which the apparatus may be arranged. The structure that supports the bellows BW2' and all the apparatus and weights associated therewith may accordingly be located on a different floor from that where the bellows assemblies B2 and B2' are located, or it may be placed on a lower floor or in a basement.

An upward force may of course be directed against the bar or bolt 34, in which case it is the bellows below the central plate C2' that are compressed as a result of the pressure of nut 40 on plate 38. These bellows communicate with each other and with the tube 83 that may be connected to the master pressure cell or bellows BW2' by means of the control valves V2' and V2$a$. To effect such connection, the control valve V2' must of course be turned counterclockwise from the position shown in the figure so that port 84 will open into the valve and so that port 85 will close. With valve V2' so adjusted, the upward force acting on rod 34 may be accurately measured.

The reaction of load cell L2 to compression may not only be determined by expanding the bellows attached to plate 27 and measuring the force thus exerted on the four bellows attached to the top surface of plate C2' in the manner already explained, but it may also be determined by expanding the four bellows attached to the under side of plate 46 and measuring the force exerted on bellows BW2 by the resulting compression of the bellows attached to the top of plate 27. Bellows BW2 will of course expand in response to this, and if the force applied is sufficiently great, the upward movement of the top plate of bellows BW2 will be arrested by its engagement with the safety stops 150 and 151. Weights may then be applied to the top plate until the micro null sensor 62 reads zero. The force exerted may then be determined from the weights required to accomplish this, and the response of the load cell may be ascertained from the meter 92 electrically connected to the load cell. The load cell may be checked in this way, or the same procedure may be followed for the original calibration of the cell.

It is advisable that plates 26 and 27 of the bellows assembly B2 above the load cell L2 be kept parallel. Accordingly, all of the bellows except one that are attached to the top surface of member C2 may be equipped with a deflection compensating trimmer bellows such as the bellows shown inside of bellows B2$b$. Such compensating bellows may be operated as described in connection with bellows 54 in the master pressure cell or bellows BW2.

It is of course possible to use suspended weights in connection with the closed hydraulic system in the upper portion of FIG. 2, and it is likewise possible to use an arrangement like that shown in the upper portion of the figure to restore the bellows assembly B2' to equilibrium. The method of applying weights to the top of a bellows, as indicated in the upper portion of the figure, or of suspending them on a yoke as shown in the lower portion of the figure, may be used interchangeably according to choice, both means being shown in FIG. 2 merely to illustrate the variety of apparatus that may be used in connection with various embodiments of the invention.

The sophisticated apparatus illustrated in FIG. 2 embodies still other sophisticated features not yet explained. Such an explanation has been reserved until the general operation of the main components has been set forth, as a complete understanding of the controls and auxiliary equipment may probably be obtained more readily if the general system is first understood. Such auxiliary equipment includes the hydraulic fluid reservoir 180, the hydraulic pump 87, the valve V2$a$', and the tubes 89, 90 and 91 by which these components are connected to the conduit 65. These components may initially be used for filling the various bellows and tubes associated with the closed system in the lower part of FIG. 2, but similar means may also be incorporated into the closed hydraulic system shown in the upper portion of the diagram for filling the bellows and tubes and for other purposes shortly to be explained.

The volume of the oil in the bellows and tubes when they are properly filled should be the same as the cubical capacity of the bellows and tubes when they are empty. When the bellows are empty and at rest, the metal will be completely free from strain and tension, and it is desirable that this freedom from tension be retained. Filling means should therefore be employed to fill the bellows only to this capacity and to avoid unnecessarily entrapping air in them. Filling ports, preferably located near the top of each bellows, should then be sealed to assure a completely closed hydraulic system. Thereafter, whenever any force is applied to any bellows, all other bellows in the same closed system that are not constrained in some way against expanding will of course expand sufficiently to absorb the oil expelled by the compressed bellows. Bellows that are expanding should not be permitted to expand to a point where the metal might "take a set" or where other damage might occur. Limiting stops are therefore provided. The under surface 150' of cross member 68 is such a limiting stop, as are also the fixed members 150 and 151 above bellows BW2. Other limiting stops 152 and 152$a$ are provided for the large set of bellows B2 above the load cell L2, and the bellows assembly B2' below the load cell has two such stops 152' and 153' for the bellows above the central supporting plate C2' and two others, 152$a$' and 153$a$', for the bellows below this central plate.

When a set of bellows is temporarily compressed by a weight or other force being measured, there will of course be spring tension on the bellows. For precision results this spring tension should be removed by introducing sufficient oil into the compressed bellows from the reserve fluid reservoir to restore the surface receiving the force to the precise position that it occupied before the force was applied. The bellows assembly B2′ may be supplied with extra oil for such purposes from reservoir 180 by turning on the hydraulic pump 87 and opening valve V2a with valve V2′ turned so that the extra oil will proceed into the proper bellows. When the original position of the plate receiving the pressure has been restored, these valves should immediately be closed. Bellows BW2′ meanwhile will remain expanded as far as the limiting stop 150′ will permit. Weights may then be applied to tray 82 not only until the surface 88 has broken contact with the limiting stop 150′ but until the top of the bellows is restored to the position that it occupied before there was any tension whatever upon bellows BW2′. This bellows will then again be free from spring tension, and the weights resting upon the tray may accordingly be used to measure very accurately the force acting upon the bellows that was compressed in the bellows group B2′. The effect of a very small fraction of an ounce may be detected. The micro null sensor associated with bellows BW2 will respond this accurately.

The adjustment of the bellows above member C2 in the bellows assembly B2 may be determined by consulting the micro null sensor 95 associated with these bellows, and similar information may be obtained with respect to the bellows below the supporting plate C2 by consulting the micro null sensor 96.

Whenever a force is exerted upon the bellows assembly B2, using the assembly B2′ as a reference, the resulting force acting on the load cell L2 will be indicated on the dial of instrument 92; and likewise if the force to be measured is applied to the bellows assembly B2′ using the bellows assembly B2 as a reference, the resulting variation in pressure on the load cell, regardless of whether the force introduces compression or tension, will be shown by the dial of instrument 92, which indicates the plus or minus forces upon the load cell. It is thus possible to add weights to the tray 82 of the master pressure cell unit until the dial of instrument 92 indicates that sufficient fluid has been forced into the appropriate bellows connected to the load cell to release the load cell from all pressure. This indicating means, which is extremely sensitive, may thus be used for a much more sophisticated measurement than can be made by relying upon the pointers 22 and 23 of the system illustrated in FIG. 1.

It is of course not necessary that all of the controls and indicators described in the foregoing paragraphs be used, but various controls and indicators have been shown in order to indicate the variety of components from which a selection may be made in the design of the complete sophisticated multiplying and measuring system.

In FIGS. 2 and 3 the arrangement of the bellows was such that the rod to which the force to be measured was applied could move in the open space between these clusters of bellows. The lower portion of FIG. 4 shows an arrangement employing a large single bellows B4a above the center plate C4 and a similar bellows B4c below the center plate with a bolt or rod 97 extending vertically through the center of both of these bellows and through a clearance hole in the intervening plate. This arrangement requires a central bellows B4e on the inside of the larger bellows B4a′ above plate C4′ and another central bellows B4e′ below it. The top edges of bellows B4a′ and the bottom edges of bellows B4c′ are of course welded respectively to the top and bottom plates 98 and 99. It is also necessary that the top and bottom edges of bellows B4e, FIGS. 4 and 6, be welded respectively to the plates 98 and C4′. This leaves an annular space between the outer walls of bellows B4e and the inside surface of the walls of bellows B4a′. The hydraulic fluid of course occupies this annular space. Bellows B4e, however, is empty, and the rod or bolt 97 can thus extend through the bellows and through suitable clearance holes in plates 98 and 99. This same arrangement of course also applies to bellows B4c′ and B4e′.

Various means of adjustment have been described to avoid having to depend upon a fixed separation of the central members or plates C2 and C2′ which are anchored in the side walls 24 and 25. It is sometimes necessary, however, to vary this separation. FIGS. 4, 5 and 6 show two ways in which this may be accomplished. This structure is supported on two vertical members 101 and 102 shown in both FIGS. 4 and 6 and a third parallel vertical member shown in cross section in FIG. 6, the latter being omitted from FIG. 4 for the sake of clarity.

The central plate C4′ on which bellows B4a′, B4e, B4e′, B4a and B4c′ are supported is provided with three recesses 104, 105 and 106 in its three corners respectively to straddle and clear the three supporting posts 101, 102 and 103. Posts 101 and 102 are provided with a series of vertically spaced holes 110 and 111 respectively (FIG. 4) and post 103 has a similar series of holes 112, indicated by a single such hole shown in FIG. 6. These vertically spaced holes in the supporting posts make it possible to mount the plate C4′ in any of a series of vertically spaced positions by means of mounting pins or dowels 107, 108 and 109, each of which extends through appropriate clearance holes in plate C4′ and through the appropriate hole in the series of holes 110, 111 and 112 in posts 101, 102 and 103 respectively.

In many applications, as hereinbefore explained, the upper assembly of bellows must be discreetly spaced with respect to the lower assembly. In order to achieve this result, the apparatus shown in FIGS. 4 and 5 is provided with micrometric means for raising and lowering the plate C4. This means comprises three round rods 113, 114 and 115 appropriately journalled in the posts 101, 102 and 103 respectively for rotation. The upper portion of each of these rods is threaded through an appropriate threaded aperture near one of the three corners of the plate C4.

Three sprocket wheels 116, 117 and 118 are secured respectively to shafts 113, 114 and 115 for rotation therewith, and an endless chain 119 is in meshed engagement with each of the three sprocket wheels. A crank 120 is secured to shaft 114. The three shafts may all be rotated in unison by means of the crank 120 so that the plate C4 and all of the bellows supported thereby may be raised or lowered according to the direction in which the crank 120 is turned.

One reason for providing adjustable spacing between the supporting members C4 and C4′ is to permit the ready substitution of load cells for test or calibration between the upper and lower bellows assemblies.

Many of the forces that are to be measured may not be directed perpendicularly with respect to the end plates of the bellows assemblies. The direction of the forces may vary angularly as indicated by the four lines 42, 43 and 44 in FIG. 1. This may cause the bellows to flex, as illustrated in FIGS. 9 and 10. It is advisable that this flexing be controlled, as obviously precision weighing could not be accomplished if the bellows should wobble around. Moreover, such flexing in some cases could change the effective area of the bellows and alter the ratio between the effective area of the bellows receiving the forces to be measured and the area of the master pressure-determining bellows. Means are therefore provided for assuring that a bellows will flex around a central point midway between the upper and lower plates.

One such arrangement is illustrated in FIGS. 7, 8 and 9, this arrangement being shown diagrammatically in FIGS. 7 and 8, whereas FIG. 9 shows a physical embodiment of the conception. A bar 121, FIGS. 7 and 8, is connected at one end by a flexure joint to a bracket 122 rigidly secured to the top plate 123 of the bellows B7. The opposite end of bar 121 has a flexible connection to the end of bracket 124 which is rigidly secured to the bottom plate 125. The transverse member 127 is pivoted at its center 131 to the mid point of bar 121 by a universal joint arrangement. End 126 of the transverse member 127 is flexibly pivoted to a bracket 129 that is firmly secured to the top plate 123, and the opposite end 128 of the transverse member is similarly flexibly hinged to the bracket 130 appropriately attached to the base plate 125 of the bellows. Inasmuch as bar 121 and member 127 pivotally connected at their centers and since both ends of both of these members are flexibly supported to the brackets that individually support them, the bellows will flex in all directions around the central point 131. The action is very much the same as that of a universal joint excepting for the fact that the end plates may vary their spacing, which is of course true of the end members of the conventional universal joint structure.

FIG. 9 shows a physical embodiment of the conception diagrammatically illustrated in FIGS. 7 and 8. In the device of FIG. 9, the cross bar, the transverse member, the four brackets and two end plates have all been given the same reference numerals as the corresponding parts in FIGS. 7 and 8 excepting that an *a* has been added. The operation of this physical structure should therefore be clear.

An oil-filled bellows equipped with the flexing control structure just described is a great advance over universal flexures heretofore used for pivotally supporting heavy loads. Since the actual hinge or pivot members in the universal flexures of the prior art are just webs of flexible metal, they collapse under heavy load, because the webs in compression must withstand the entire force that is directed against them. With the flexing bellows structure just described, practically all the force directed against the flexing bellows is borne by the oil, the internal flexing control structure merely serving to localize the point around which the bellows flexes. A flexure of this type is shown inside of bellows B1 in FIG. 1. Two bellows containing such flexures may be connected together with the bottom of one bellows against the top of the other. This provides a double flexure structure of great versatility. One of its uses is to transmit rectilinear motion from one rectilinearly movable member to another rectilinear member under conditions in which the driving and the driven member may not at all times remain perfectly aligned, end to end, even though they may remain parallel.

It is possible to use two bellows equipped with such internal flexures for so coupling two misaligned members that one may either push or pull on the other. In this case, the two bellows may be attached to opposite sides of a central plate. One of the shafts should be attached to this central plate by means of a yoke straddling one of the bellows, and the other shaft should be connected to the outside end plates of both bellows by a yoke that straddles both of the bellows as well as the intervening plate.

FIG. 10 shows an arrangement in which the structure that provides the universal joint action is located on the outside of bellows B10. In this embodiment, the bottom plate has two lateral arms that are each bent in an upward direction at their outer ends 135 and 136 respectively and these ends are pivoted to a ring 137 that encircles the bellows. The top plate 138 is provided with lateral arms 139 and 139'. Arms 139 and 139' are pivoted to ring 137 at points that are spaced from the pivot points of arms 135 and 136 by ninety degrees. This structure, like that shown in FIGS. 7, 8 and 9, likewise permits the two ends of the bellows to move with respect to each other around a central point exactly midway between the centers of the plates. When this arrangement is used with an oil-filled bellows, the weight is of course supported almost entirely by the oil, as in the case with the universal flexure structure previously described.

In other applications of my force measuring apparatus, it is desirable that the top plate of the bellows be constrained to move substantially rectilinearly with respect to the bottom plate. One arrangement for assuring such movement is illustrated in FIGS. 13 and 14. In the embodiment here illustrated, the top plate 140 and the bottom plate 141 are both D-shaped and so oriented with respect to each other that they are angularly aligned and substantially superimposed. The top plate 140, however, is provided with an integral depending arm 142 that is at right angles to plate 140. The bottom plate 141 is attached to the horizontal arm 143 of an L-shaped bracket 144 having a vertical arm 145. A rectangular plate 146 is hinged at its left edge by means of a flexible web 147 to the top portion 148 of the depending arm 142 which is integral with the top plate of the bellows. The right edge of plate 146 is hingedly connected by a flexible web 149 to the top portion of the vertical arm 145. Another plate 150 is also interposed between the depending arm 142 and the upright member 145 of bracket 144. Plate 150 is substantially parallel to plate 146 and its right and left edges are connected to lower portions of arm 142 and the upright 145 by means of flexures like those just described.

The left edges of plates 146 and 150 of course move arcuately around the flexures that connect the right ends of these plates to member 145. Aside from a slight right and left movement, the plate 140 moves substantially translationally and it may therefore be considered to have a rectilinear motion as it moves up and down while remaining parallel to the base plate 141 of the bellows.

The structure diagrammatically illustrated in FIG. 15 is a modification of the structure just described, the modifications permitting the top plate 151 of bellows B15 to have an almost perfect straight line motion as it moves up and down while remaining parallel to the bottom plate 152. A vertically disposed arm 157 is integrally attached to the top plate 151 of bellows B15, and a vertical plate 158 with a horizontal arm 159 attached to its upper edge is integrally secured at right angles to the horizontal member 160 to which the bottom plate 152 of the bellows is attached. The left ends of panels 154 and 155 are suitably hinged in spaced relationship to the depending arm 157 of the top plate 151 of the bellows, and the right edges of panels 154 and 155 are appropriately hinged respectively to the right ends of panels 153 and 156. The left end of panel 153 is hinged to the overhanging vertical arm 159 at a point above the left edge of panel 154, and the left edge of panel 156 is suitably hinged below the left end of panel 155 to member 162 that extends horizontally to the left from the vertical member 158.

FIGS. 11 and 12 illustrate an arrangement for supplying vernier bellows whose effective area is adjustable. These figures show three such bellows B11*a*, B11*b* and B11*c* arranged around the periphery of bellows B11, but obviously any number of such vernier bellows may be symmetrically arranged around the main bellows for the purposes about to be described.

Three shafts 164*a*, 164*b* and 164*c* are attached respectively to the top plates 165*a*, 165*b* and 165*c* of the three vernier or trimmer bellows. The top ends of rods 164*a*, 164*b* and 164*c* are hinged respectively around the outer edge of the top plate 163 of bellows B11 at points 167*a*, 167*b* and 167*c*. Three brackets 162*a*, 162*b* and 162*c* are so angularly and radially disposed around the bellows B11 that the vertical plates that are integral members of these brackets are aligned with the center of the adjacent trimmer bellows. Each of the upright portion 168*a*, 168*b* and 168*c* of the three brackets has an arcuate top edge that is concentric with the pivot point of the rod attached to the top of the associated trimmer bellows, and each of the trimmer bellows has a bifurcated pointer member that is attached to its bottom plate. Thus the bifurcated pointer member 172*a* is attached to plate 170*a* of bellows B11*a*, the bifurcated pointer 172*b* is attached to the bottom plate of trimmer bellows B11*b*, and the bottom plate of bellows B11*c* is equipped with a bifurcated pointer 172*c*. Each of these bifurcated pointers straddles the arcuate edge of the associated vertical plate, and each of these plates has an arcuate slot extending therethrough, each of these slots being disposed parallel to the top arcuate edge of the plate.

Plate 168*a* has an angularly calibrated scale 169*a* arranged concentrically with respect to slot 171*a*, and similar calibrated scales are associated with the arcuate slots in the upright members 168*b* and 168*c* of brackets 162*b* and 162*c* respectively. Each of the bifurcated pointers is provided with a clamping screw that extends from one side thereof through the slot in the vertical plate and into the other side of the bifurcated member which is threaded so that rotation of this screw may serve to tighten the pointer in any adjusted angular position.

The three bellows are each provided with a flexible tube that communicates with the main central bellows. Such a flexible tube 174*a* is shown connected to bellows B11*a* and the central bellows B11, and another such tube 174*b* communicates with bellows B11*b* and the main bellows B11.

It should be clear from the foregoing description that the three vernier bellows and the main bellows are all in communication hydraulically, and it should likewise be clear that if all of the vernier bellows are positioned so that their associated rods are vertical, the effective area of each of the three bellows will be maximum, and that their effective areas should be added to the area of the central bellows B11 in order to determine the combined maximum area of all four bellows. It should also be apparent that if the three bellows could be swung out so that their central axes would be horizontal, the effective area of each of the vernier bellows would be zero and thus contribute nothing to the effective area of the four bellows. It will consequently be clear that if a given bellows is swung outward from a vertical position toward a position in which its pointer approaches the outer end of the associated scale, the effective area of this bellows will decrease. We thus have three vernier bellows whose effective areas may be adjusted by suitably positioning their bifurcated pointers with respect to their associated calibrated scales. If the maximum area of each vernier bellows is known, any desired effective area of any one bellows below its maximum value can readily be obtained by calculating what the angular position of the bellows should be and then setting the bellows in that angular position.

FIGS. 16 and 17 illustrate a hydraulic bellows scales or weighing apparatus capable of weighing loads that are very great. This weighing device has a top platform 176 mounted on the top plates of a plurality of bellows. Two of the supporting bellows B16*a* and B16*b* may be seen in FIG. 16, while these two bellows and an associated bellows B16*b* may all be seen in phantom in FIG. 17, which is a cut-away plan view of the platform portion weighing device.

It is practical to arrange four very large bellows at the corners of such a platform as platform 176*c*, but instead of using a single large bellows in these positions, a cluster of bellows may be employed in order to provide a scales of great capacity. It is possible to provide a weighing device of this nature capable of handling loads of a few million pounds which may be used for weighing such heavy structures as cargo planes.

The various bellows are mounted upon a base 177, and means may be employed for assuring that the top plate 176 will not move laterally or transversely with respect to the base 177. This may be done by utilizing any of the control mechanisms shown in the preceding figures, such control structure being represented diagrammatically between the platform 176 and base 177 and identified generally by the numeral 179.

Each of the bellows that support plate 176 communicates with an individual indicating bellows by means of an interconnecting conduit. Thus, tube 181*b* hydraulically connects bellows B16*b* to the indicating bellows 197*b*, and tube 181*a* hydraulically connects bellows B16*a* with the indicating bellows 197*a*. Four such indicating bellows 197*a*, 197*b*, 197*c* and 197*d* are shown at the right in FIG. 16. These bellows serve to communicate the pressure of the large bellows that are individually associated therewith to the large indicating bellows B16*f* into which the combined effect of the four indicating bellows is integrated. The bottom plate 190 of the master indicating bellows B16*f* rests upon the top plates of the four bellows that are individually associated with the four bellows which support the platform 176.

Inasmuch as the pressure in these bellows will individually vary with the position and weight of the various portions of the load upon plate 176, it would be possible for such varying pressures to cause plate 190 to tilt unless stabilizing means are provided. Such tilting may be obviated by equipping the bottom plate bellows B16*f* with the tilt-preventing arrangement illustrated in FIGS. 13 and 14. Accordingly, the bottom plate 190 of bellows B16*f* is provided with an integral vertical extension 189 which is connected by plates 187 and 188 whose opposite edges are hinged by suitable flexing members to the vertical extension 189 and the vertical supporting member 182. With this arrangement, each of the bellows 197*a*, 197*b*, 197*c* and 197*d* contribute their individual push to the bottom plate of the bellows without causing any appreciable tilting of such plate.

It is also desirable that the top plate 183 of bellows B16*f* which receives the counterbalancing weights W16 be equipped with suitable tilt-preventing means, preferably like that employed for the lower plate. To this end, the top plate 183 is provided with a depending vertical extension 184 to which members 185 and 186, that the the counterparts of plates 187 and 188 in the lower part of the structure, are hinged; and the left edges of plates 185 and 186 are similarly hinged by appropriate flexing members to the vertical support 182.

Any weight upon platform 176 will of course cause the entire bellows B16*f* to rise, and the top plate 183 of the bellows may move up under this influence as far as the limiting stop 196. The application of counterbalancing weights W16 to plate 183 will of course lower not only this top plate, but will also transmit the pressure back through the small bellows which communicate hydraulically with the four large bellows that support the platform 176. By continuing to add counterbalancing weights W16 to the top plate 183 of bellows B16*f* until the pointer 195 is aligned with pointer 194, the exact weight of the load upon platform 176 may be determined.

Pointer 194 is shown attached to a plate 192 adjustably mounted upon a base member 191 so that pointer 194 may be initially positioned at a point aligned with pointer 195 when bellows B16*f* and the platform 176 are free from any load. This assures that when weights are added to the top surface 183 until substantial balance is obtained, the bellows will be free from spring tension that might affect the accuracy of the weighing procedure.

The weighing device illustrated in FIGS. 16 and 17 may of course be modified and rearranged in a variety of ways that will readily suggest themselves to those skilled in the art after they have become familiar with the teachings of this patent. Likewise, all of the elements in the various weighing, measuring and testing devices shown in the figures and described in the specification may be modified, and other components may be substituted for those shown and described or set forth in the claims without departing from the broad spirit of the invention.

The inventor claims:

1. In apparatus for measuring forces: a bellows comprising compressible and extensible sides, a top plate for receiving the force to be measured, and a bottom plate, said plates sealed to said sides to define a first chamber of variable capacity; instrumentalities defining a second chamber of variable capacity, said instrumentalities including a base and a cover, said cover having an area materially less than that of said top plate; conduit means communicating with said first and second chambers; first measuring means for accurately determining a variation in the distance between said plates; a third chamber of variable capacity communicating with said first and second chambers; a substantially noncompressible fluid filling said chambers and said conduit; said chambers, conduit and fluid constituting a closed hydraulic system; micrometric means for increasing or decreasing the capacity of said third chamber to selectively force fluid into or out of the remainder of said system in order to alter the distance between said plates when the distance between said cover and base is fixed, or to alter the distance between said cover and base when the distance between said plates is fixed; and means for applying a measured compensating force to said cover that will separate said plates by the same distance that separated them before the force to be measured was applied to said top plate, whereby the magnitude of the force to be measured may be determined by multiplying the measured compensating force by the ratio of the area of said top plate to the area of said cover.

2. In apparatus for measuring forces: a bellows comprising compressible and extensible sides, a top plate for receiving the force to be measured, and a bottom plate, said plates sealed to said sides to define a first chamber of variable capacity; instrumentalities defining a second chamber of variable capacity, said instrumentalities including a base and a cover, said cover having an area materially less than that of said top plate; conduit means communicating with said first and second chambers; first measuring means for accurately determining a variation in the distance between said plates; a third chamber of variable capacity communicating with said first and second chambers; a substantially noncompressible fluid filling said chambers and said conduit; said chambers, conduit and fluid constituting a closed hydraulic system; micrometric means for increasing or decreasing the capacity of said third chamber to selectively force fluid into or out of the remainder of said system in order to alter the distance between said plates when the distance between said cover and base is fixed, or to alter the distance between said cover and base when the distance between said plates is fixed; a fluid reservoir, a hydraulic pump communicating with said reservoir; a pipe connecting said pump to said closed hydraulic system; a valve in said pipe; and means for applying a measured compensating force to said cover that will separate said plates by the same distance that separated them before the force to be measured was applied to said top plate, whereby the magnitude of the force to be measured may be determined by multiplying the measured compensating force by the ratio of the area of said top plate to the area of said cover.

3. In apparatus for measuring forces: a bellows comprising compressible and extensible sides, a top plate for receiving the force to be measured, and a bottom plate, said plates sealed to said sides to define a first chamber of variable capacity; instrumentalities defining a second chamber of variable capacity, said instrumentalities including a base and a cover, said cover having an area materially less than that of said top plate; conduit means communicating with said first and second chambers; means for keeping said chambers and conduit filled with a substantially noncompressible fluid to maintain a closed hydraulic system; means for applying a measured compensating force to said cover that will separate said plates by the same distance that separated them before the force to be measured was applied to said top plate, whereby the magnitude of the force to be measured may be determined by multiplying the measured compensating force by the ratio of the area of said top plate to the area of said cover; and means for constraining said bellows to flex sideways only around a point that is substantially midway between said plates.

4. In apparatus for measuring forces: a bellows comprising compressible and extensible sides, a top plate for receiving the force to be measured, and a bottom plate, said plates sealed to said sides to define a first chamber of variable capacity; instrumentalities defining a second chamber of variable capacity, said instrumentalities including a base and a cover, said cover having an area materially less than that of said top plate; conduit means communicating with said first and second chambers; means for keeping said chambers and conduit filled with a substantially noncompressible fluid to maintain a closed hydraulic system; means for applying a measured compensating force to said cover that will separate said plates by the same distance that separated them before the force to be measured was applied to said top plate, whereby the magnitude of the force to be measured may be determined by multiplying the measured compensating force by the ratio of the area of said top plate to the area of said cover; and means for constraining said bellows to flex sideways only around a point that is substantially midway between said plates, said constraining means being located within the bellows.

5. In apparatus for measuring forces: a bellows comprising compressible and extensible sides, a top plate for receiving the force to be measured, and a bottom plate, said plates sealed to said sides to define a first chamber of variable capacity; instrumentalities defining a second chamber of variable capacity, said instrumentalities including a base and a cover, said cover having an area materially less than that of said top plate; conduit means communicating with said first and second chambers; means for keeping said chambers and conduit filled with a substantially noncompressible fluid to maintain a closed hydraulic system; means for applying a measured compensating force to said cover that will separate said plates by the same distance that separated them before the force to be measured was applied to said top plate, whereby the magnitude of the force to be measured may be determined by multiplying the measured compensating force by the ratio of the area of said top plate to the area of said cover; and means for constraining said bellows to flex sideways only around a point that is substantially midway between said plates, said constraining means located outside said bellows.

References Cited by the Examiner

UNITED STATES PATENTS

| | | | |
|---|---|---|---|
| 278,903 | 6/1883 | Emery | 177—254 X |
| 1,232,983 | 7/1917 | Schenk | 177—254 |
| 2,285,892 | 6/1942 | Bohannan | 177—254 X |
| 2,639,613 | 5/1953 | Richmond | 177—208 X |
| 2,816,443 | 12/1957 | Gomez et al. | 73—398 X |
| 3,062,046 | 11/1962 | Evans | 73—1 X |
| 3,091,303 | 5/1963 | Moses et al. | 177—208 |

RICHARD C. QUEISSER, *Primary Examiner.*
C. A. RUEHL, *Assistant Examiner.*